ULTRAVIOLET ABSORPTION SPECTRUM OF
ST. GRISEUS PROTEASE

DIGESTION OF CASEIN

RELATION BETWEEN pH AND ENZYME ACTIVITY
OF ST. GRISEUS PROTEASE

DIGESTION OF CASEIN 3,127,327
EXTRACTION OF PROTEASE FROM A CULTURE BROTH OF STREPTOMYCES GRISEUS
Masao Nomoto, Masaya Yanagita, Takeo Akahira, Hiroshi Kawabe, and Yoshiko Narahashi, Tokyo, and Shigeo Fujita, Yokohama City, Japan, assignors to Rikagaku Kenkyusho, Tokyo, Japan
Filed Feb. 28, 1961, Ser. No. 92,403
9 Claims. (Cl. 195—62)

The present invention relates to a new protease of *Streptomyces griseus*, having an extremely strong hydrolyzing activity for protein.

An object of the invention is to provide the above-mentioned protease as a highly purified enzyme preparation. It has been observed by applicants that a remarkable amount of the protease is produced in the culture broth by a strain of *Streptomyces griseus*, a species of Actinomycetes which has been employed together with streptomycin in the manufacture of streptomycin. The protease has been isolated from the broth and its properties have been investigated by the applicants and has been ascertained that the protease has excellent characteristics which have heretofore not been obtainable and which make the protease greatly useful in industrial applications.

In order to facilitate an understanding of the invention there is provided an appended drawing wherein:

FIGS. 3 and 4 graphically represent the digestion of casein by *Streptomyces griseus* protease as compared to other proteases.

Figure 1:
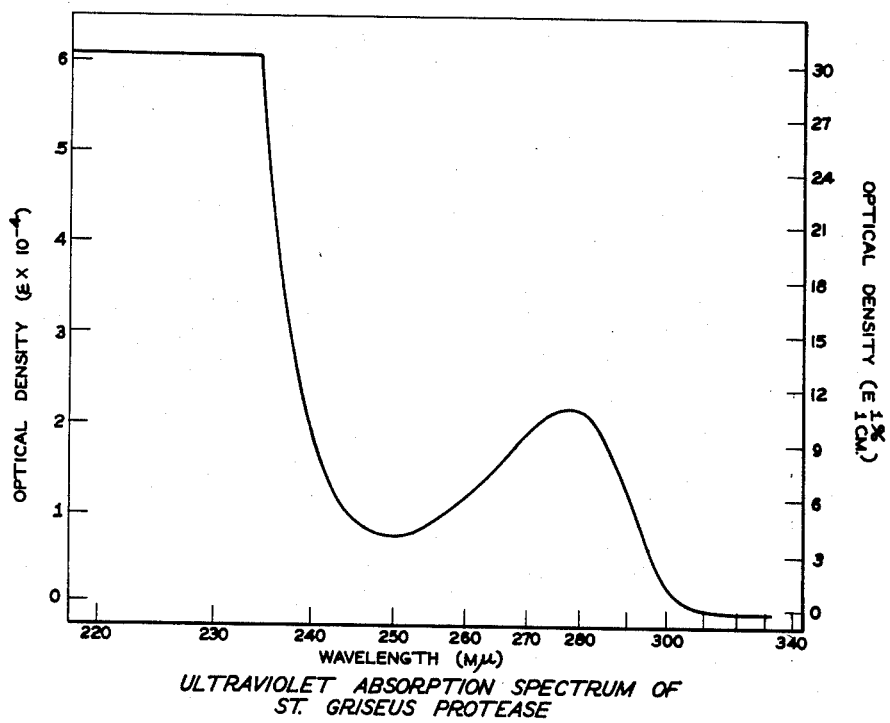
FIG. 1 is a curve illustrating the absorption spectrum of *Streptomyces griseus* protease.

The protease referred to the above has the general properties as follows: sedimentation constant $(s_{20,w}) = 2.8 \times 10^{-13}$ (cm./sec.)/(dyne/g.); diffusion constant $(D_{A20,w}) = 13.1 \times 10^{-7}$ (cm.$^2$/sec.) or $(D_{\mu 20,w}) = 13.4 \times 10^{-7}$ (cm.$^2$/sec.); molecular weight according to the expression $M_{SD} = RTs/D(1-V\rho)$ becomes $M_{SD} = 20,000$; isoelectric point is about pH 5.0–5.5. Ultraviolet absorption spectrum of the protease (FIG. 1) is of the type characteristic of most proteins and shows no indication of the presence of a special group. The element composition of the enzyme is C, 52.0%; H, 6.8%; N, 14.8%; S trace and Ca, 0.8%.

Figure 2:
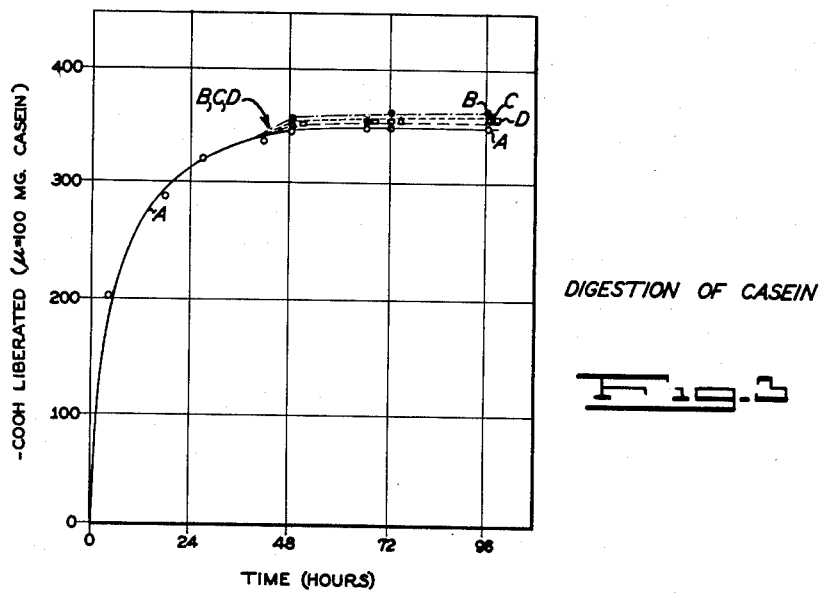
FIG. 2 shows graphically the relation between pH and enzyme activity of *Streptomyces griseus* protease.
Figure 2:
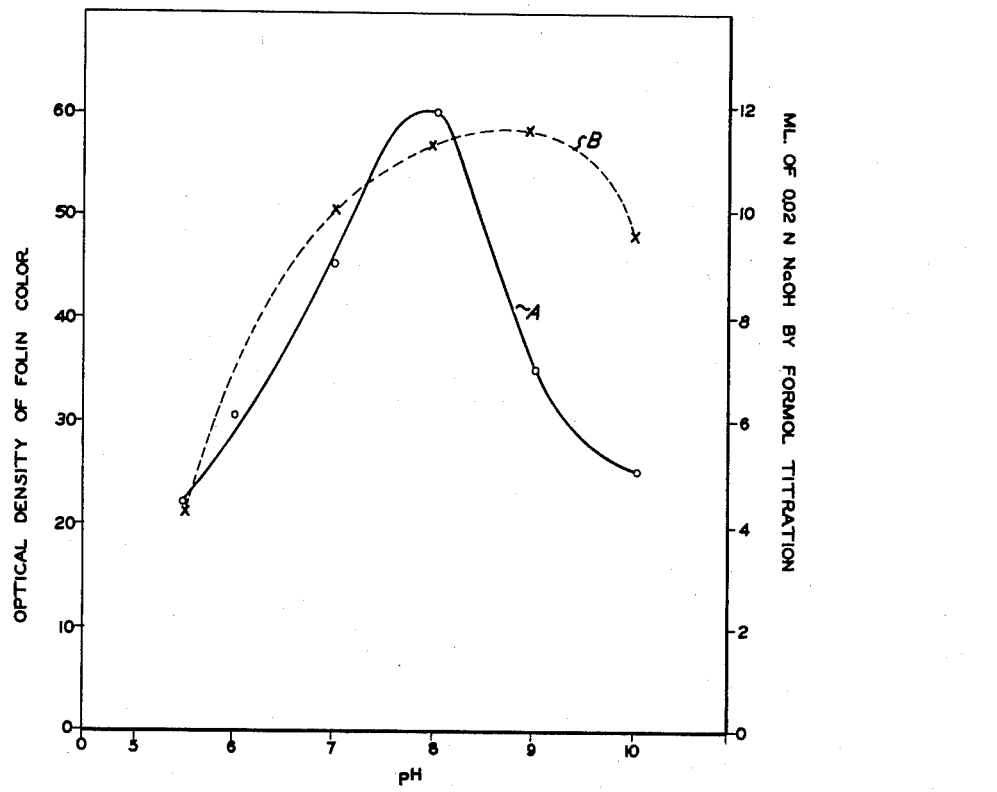

The optimum pH for the enzyme activity measured by the casein-Folin color method is about 8.0 and that by casein formol titration method is 8–9 (FIG. 2). The enzyme is fairly stable at pH 6–9 below 40° C. but only slightly stable about 60° C. The stability in heating of this enzyme becomes much better in the presence of substrates. Accordingly, in a short time reaction, the so-called optimum temperature for digestion is found to be 60°–80° C.

The protease is easily soluble in distilled water or diluted salts solution. The enzyme is soluble in an ammonium sulfate solution of up to 0.3 saturation (w./v.), but at 0.4 saturation it becomes almost insoluble. At ice cold temperature, the enzyme is soluble in acetone solution of 50 percent concentration but not of 60 percent. Calcium ion is an essential factor for stabilizing this protease. Under conditions in which calcium ion is deficient, the enzyme is readily inactivated by a method such as salting out, dialysis, ion exchange resin column treatment or heating. It was found, however, that the enzyme was highly protected from inactivation during the above-mentioned procedures by the presence of a small amount of calcium ion. The enzyme was also inactivated irreversibly by mixing it with EDTA. It seems that the active configuration of the protease can be maintained and the denaturation of the enzyme can be prevented by combining the enzyme with calcium ion. Strontium ion also has been effective as a protective ion. In other metal ions, however, such an effect has not been found. Furthermore, it has been found that the protease is adsorbed on and eluted from the cation exchange resin column in which the functional group of the resin is in the state of calcium-form, in a good yield. This seems to indicate that calcium ion is not only the stabilizing factor of the protease but also the medium of enzyme-resin complex formation in resin column treatment.

This protease is capable of digesting almost all kinds of proteins such as human serum albumin, bovine serum albumin, ovalbumin, human serum γ-globulin, casein, hemoglobin, fibrinogen, gelatin, edestin, soybean glycinin, wheat gluten (glutenin), rice orizenin, etc. The scleroproteins such as keratin and silk fibroin were hardly digested by this protease.

A protein denatured by heating or urea treatment is hydrolyzed by this protease faster than untreated protein. All the denatured proteins tested are digested by this protease till the proteins cause no precipitation by 0.4M trichloroacetic acid. This property is not observed in the case of other neutral proteinases such as trypsin and chymotrypsin, in which some of the digested products are found to remain still insoluble in 0.4M trichloroacetic acid solution. The large extent of hydrolysis of protein by *Streptomyces griseus* protease seems to be due to the broad specificity of this protease.

Figure 4:
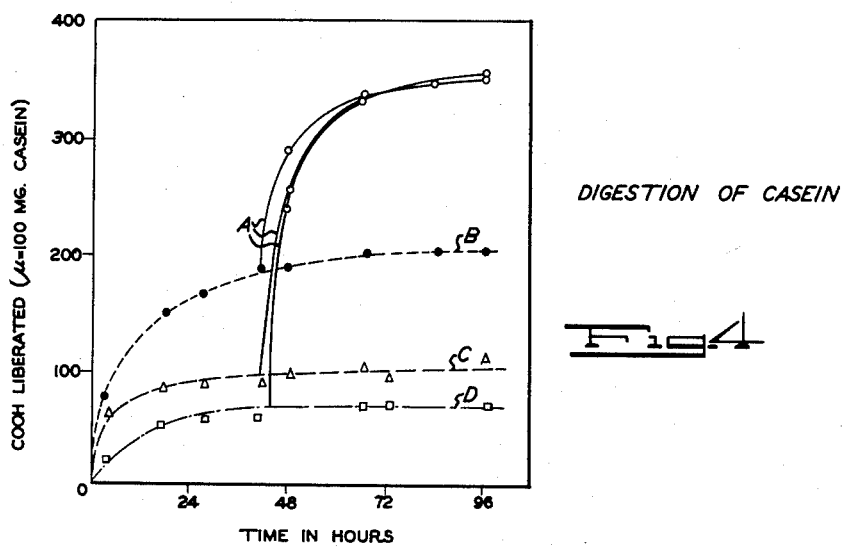

A comparison was then made between the substrate specificity of *Streptomyces griseus* protease with those of trypsin, chymotrypsin, pepsin and *Bacillus subtilis* proteinase by means of so-called cross-test. The results obtained are summarized in FIG. 3 and FIG. 4. As shown in these figures, it can be seen that *Streptomyces griseus* protease has an extremely broad substrate specificity and is able to digest casein more completely than the other proteinases. This is shown by the fact that addition of *Streptomyces griseus* protease to casein previously hydrolyzed with the other proteinase causes a marked increase in hydrolysis, whereas there is no indication of increase in hydrolysis by addition of the other proteinase to casein previously hydrolyzed with *Streptomyces griseus* protease.

The substrate specificity of *Streptomyces griseus* protease was also examined by the present inventors by the use of many kinds of synthetic substrates such as dipeptides, tripeptides, amino acid amides, amino acid esters and organic acid esters. As shown in Table I, the protease is able to hydrolyze almost all kinds of synthetic substrates offered for this experiment. In these substrates hydrolyzed by this protease, there are many kinds of typical substrates for the known proteinases and peptidases, e.g., trypsin, chymotrypsin, pepsin, papain, carboxypeptidase, leucine aminopeptidase, aminotripeptidase, iminodipeptidase, glycyl-L-leucine dipeptidase, etc. In view of the experimental results obtained, it is apparent that *Streptomyces griseus* proteases have an extremely broad substrate specificity in which the majority of substrate specificity of the known proteases are included. The protease was also found to be able to hydrolyze many kinds of amino acid amide, amino acid ester and organic acid ester. Until now, substrate specificity of known protease has been considered to be high and when the proteases can hydrolyze only a few kinds of peptide-bond which is specific for the respective protease. The above-mentioned characteristic property of *Streptomyces griseus* protease, therefore, has never been known and is presumably due to the special configuration and contraction of the active center of the enzyme protein of *Streptomyces griseus* protease.

The experimental results described above also indicate that *Streptomyces griseus* protease belongs not only to "endo-peptidase" but also to "exo-peptidase." The usually known proteases, hitherto, have been classified in the two groups, i.e., "endo-peptidase" and "exo-peptidase," according to the type of enzymatic action. *Streptomyces griseus* protease, therefore, seems to be an entirely new type of protease having both types of enzymatic action and thus to occupy a particular position in the classification of protease.

The optimum reaction pH is 8.5 for glycyl-L-leucine, about 8.2 for carbobenzoxy-L-glutamyl-L-tyrosine and 8.5–9.3 for butyric acid methyl ester, respectively. These values of pH correspond to the value of optimum pH for casein. Some kinetic properties of the protease as determined by applicants is as follows: First order proteolytic coefficient ($C_S$) is $3.34 \times 10^{-2}$ for glycyl-L-leucine and $0.18 \times 10^{-2}$ for carbobenzoxy-L-glutamyl-L-tyrosine; the Michaelis' constant ($Km$) is $1.25 \times 10^{-2}$M for glycyl-L-leucine; Activation energy ($Ea$) is $2.7 \times 10^3$ cal./mol.

As a natural consequence of the fact that *Streptomyces griseus* protease has a very broad substrate specificity as described before, almost all kinds of peptide-bond in protein are indiscriminately cleaved by this protease until the majority of amino acid constructing the substrate protein is released as free amino acid. Accordingly, the extent of hydrolysis of protein by the protease digestion was found to reach 75 percent for casein, 80 percent for wheat gluten, and 87 percent for ovalbumin in comparison with the extent of hydrolysis by acid digestion (Table II).

For reference, the values of extent of hydrolysis of casein with various proteases are summarized in Table III. As shown in the table, it is apparent that *Streptomyces griseus* protease has a substantially greater proteolytic activity when compared to known proteases and this is considered to be one of the remarkable characteristics of this protease.

From the digestion products of the above reaction mixtures, many free amino acids are detected by bioassay and paper chromatography as shown in Table IV. The rate of production of free amino acids by the protease digestion shows in general the numerical values just as anticipated from the values of extent of hydrolysis. In the digestion products, especially, many free amino acids of high nutritive value such as tryptophane, methionine, threonine etc. which are only barely obtained by acid digestion of protein were found to be recovered in a good yield.

The above-mentioned superior properties of *Streptomyces griseus* protease are expected to develop many new industrial applications in various fields of industry.

Optimum conditions for completing the hydrolysis of protein by the protease within 24–48 hours are as follows; an additional amount of the protease of 2.5–5.0 p.u./100 g. protein, optimum reaction pH of 7–8, and optimum reaction temperature of 35°–50° C. When 3–5 percent of ethanol or methanol is admixed to the reaction mixture, the contamination with bacteria can be perfectly prevented and the whole reaction can be accomplished in an open vessel.

The enzymatic digestion of protein by the protease has a number of advantages as compared with the acid digestion method, because of the marked simplicity and ease of operation, equipment and heat control. When a purified protein is used as a substrate for enzymatic digestion, a colorless clear digestion product (amino acids mixture) is easily obtainable and remarkable amounts of amino acids of high nutritive value, e.g. tryptophane, methionine, threonine, cystine, etc., are detected therein. In addition to an abundance of amino acids content, the digestion product is found to be superior to other amino acid preparations on the market as regards purity, odor, colorlessness and other properties which thereby make the product adapted for use as eutrophics, drugs, foods and condiments. The digestion product prepared from impure protein such as animal guts is also utilized for feed and bacterial culture medium. The digestion product can be also used as a raw material for isolating valuable amino acids which are easily decomposed by acid digestion method.

The protease is also found to be useful for eliminating impure protein and is widely used for leather manufacture, silk degumming, drug manufacture and removal of stains.

Scientifically, the utilization of the protease is expected to offer a new experimental means for investigations in the protein chemistry.

The quantity of the protease produced in a culture broth by *Streptomyces griseus* is about 0.5 gm. per liter of the broth and such an excellent productivity of protease is found to be almost equal to that of superior strains of *Bacillus subtilis* which have been used for industrial production of bacterial protease. Protease productivities of some microorganisms employed in commercial use are compared with that of *Streptomyces griseus* (Table V). From these results, it is obvious that the culture broth of *Streptomyces griseus* is available as a raw material for the enzyme manufacture.

It has been found by the present inventors that the protease can be separated from streptomycin by salting-out procedure with ammonium sulfate. The above method, however, seemed to be unsuitable for industrial applications, because a large quantity of ammonium sulfate is introduced into the resulting streptomycin fraction and the subsequent purification of this antibiotic becomes difficult.

It is a further object of the invention to isolate both streptomycin and the protease profitably. Therefore a further improvement has been required for the commercial production of the protease. It was found by the present inventors that some kinds of high crosslinked carboxylic acid type cation exchange resin, e.g. Amberlite IRC–50, "Kaken" C–1 (SP–7) resin (a high crosslinked salicylic acid type cation exchange resin), and Kaken C–2 resin (a high crosslinked phenoxyacetic acid type cation exchange resin), have a large adsorption capacity for streptomycin but do not adsorb any appreciable amount of the protease, whereas the lower crosslinked same type resin, e.g. "Kaken" C–1 (SP–3) resin (a low crosslinked salicylic acid type cation exchange resin), or low crosslinked other type resins (e.g. Duolite C–10 and Duolite S–30) have a high adsorption capacity for this enzyme. Results of these investigations have led to the expectation that, by resin column treatment making full use of such a "molecular sieve effect" of the above-mentioned resins, the protease and streptomycin can be efficiently isolated from the culture broth of *Streptomyces griseus*. By successive resin column treatment, the protease and streptomycin are easily isolated and they are then further purified by subsequent procedures. The outline of the purification procedures is as follows.

The filtrate of culture broth of *Streptomyces griseus* previously clarified by the calcium phosphate gel method is first passed through the column of the high crosslinked resin and next passed through the column of the lower crosslinked resin, successively. Thus, streptomycin is adsorbed on the first column and the protease on the second column. Then, the protease adsorbed on the resin column is highly purified by subsequent procedures such as displacement chromatography in elution process, salting out with ammonium sulfate, and acetone precipitation. The protease is finally obtainable as a crystalline form from acetone solution. On the other hand, streptomycin adsorbed on the first resin column is eluted from the column with diluted mineral acid and successfully purified by the usual processes. Through these treatments, about 70–80 percent of streptomycin and about 15–25 percent of the protease (in an amorphous form) are recovered as highly purified preparations, respectively. The above-mentioned purification method has the three outstanding advantages; simplicity of the process, ease of increase to accommodate future expansion of production, and good yields of both protease and streptomycin. This method, therefore, seems to be profitable in the industrial production of the protease.

A representative example of the method for purification of *Streptomyces griseus* protease is as follows: The culture broth of *Streptomyces griseus* supplied from the factory is immediately filtered to remove mycelia and other insoluble matters. To 9,000 ml. of the above filtrate, 300 ml. of 1M Na$_2$HPO$_4$ solution and 300 ml. of 1M CaCl$_2$ solution are added successively at pH 7.8. After standing for 6 hours below 10° C., the precipitated calcium phosphate gel is removed by filtration. Thus, about 10,200 ml. of yellowish filtrate is obtained showing about 90 percent recovery of the protease and almost all of streptomycin. 10,200 ml. of the above filtrate is passed through the first column (3.6×42 cm.) of "Kaken" C–1 (SP–7) resin (about 450 ml. of swelled Na-form resin, pH 8.0) at a rate of 10–15 ml. per minute. In this effluent, there is about 90% of the protease but no streptomycin. The streptomycin has been almost completely adsorbed on the first column and is then eluted from the column by passing about 1,200 ml. of N/2 HCl. About 90 percent of the adsorbed streptomycin is recovered in this eluate. Further purification of streptomycin is easily accomplished by the usual process. The above effluent passing through the first column is successively passed through the second column (2.6×44 cm.) composed of "Kaken" C–1 (SP–3) resin (about 240 ml. of swelled buffered-form resin pH 6.2) at a rate of 8–10 ml. per minute. The protease almost completely adsorbed on the second column is then eluted from the column by passing about 2,900 ml. of M/2 sodium borate buffer (pH 9.2) at a rate of 6–8 ml. per minute. Thus, about 900 ml. of enzyme-rich eluate is obtained and 50–60 percent of the adsorbed enzyme is recovered at ten-fold purity against the original broth. The protease eluted from the column is then precipitated by addition of 360 gm. of ammonium sulfate and collected on a Buechner funnel with the aid of a small amount of Hyflosupercel. After dissolving the precipitated enzyme in a small amount of 0.02M calcium acetate solution, the enzyme solution is dialyzed overnight against a large amount of 0.02M calcium acetate solution at 4° C. About 80 percent of the protease contained in the eluate is detected in the dialyzed solution. From the above solution, the protease is precipitated again by addition of 2 volumes of cold acetone and collected by centrifugation. Thus, a highly purified, amorphous *Streptomyces griseus* protease is obtained at a yield of 15–25 percent against the original enzyme activity contained in the culture broth. The above enzyme preparation is composed of a single, homogeneous component as determined by ultracentrifugal-, electrophoretic-, and enzymological-analyses. When a small amount of cold acetone is added to the concentrated solution of the above enzyme preparation until a slight cloudiness scarcely appears, small needle crystals of the protease are gradually formed after storage of several days in a tightly stoppered tube in a refrigerator. It is still hard, however, to prevent the crystalline preparation from contamination by amorphous protease because of similar solubilities of both forms in acetone.

TABLE I

*Hydrolysis of Synthetic Substrates With* Streptomyces griseus *Protease*

1.—DIPEPTIDES

| Substrate | Extent of hydrolysis, Percent | Assay | Isolation of products | Note |
|---|---|---|---|---|
| Gly-Gly | 3 | G | Gly-Gly, (Gly) | (1) |
| Gly-DL-Ala | 20 | G | Gly, Ala, Gly-Ala | |
| Gly-DL-Val | 39 | G | Gly, Val, Gly-Val | |
| Gly-L-Leu | 102 | G | Gly, Leu | (2) |
| Gly-DL-Norleu | 150 | G | Gly, Norleu | |
| DL-Ala-Gly | 90 | G | Ala, Gly | |
| D-Ala-L-Ala | + | P | Ala, Ala-Ala | |
| DL-Ala-L-Leu | 121 | G | Ala, Leu | (3) |
| DL-Val-Gly | 143 | G | Val, Gly | |
| DL-But-Gly | 133 | G | But, Gly | |
| L-Leu-Gly | 40 | G | Leu, Gly | (3) |
| D-Leu-Gly | 5 | G | D-Leu-Gly | |
| L-Leu-L-Ala | +++ | P | Leu, Ala | (3) |
| Gly-L-Asp | 40 | G | Gly, Asp | |
| DL-Ala-DL-Glu | (3) | G | Ala-Glu | |
| DL-Ala-L-Arg | +++ | P | Ala, Arg | |
| L-Leu-L-Arg | +++ | P | Leu, Arg | |
| L-Arg-Gly | + | P | Arg, Gly | |
| L-Arg-L-Leu | +++ | P | Arg, Leu | |
| L-Arg-L-Phe | +++ | P | Arg, Phe | |
| L-Phe-L-Arg | +++ | P | Phe, Arg | |
| DL-Phe-Gly | 25 | G | Phe, Gly, Phe-Gly | |
| DL-Phe-DL-Ala | 58 | G | Phe, Ala, Phe-Ala | |
| DL-Ala-DL-Phe | 130 | G | Ala, Phe, Ala-Phe | |
| Gly-L-Tyr | { 92 / 98 } | N / G | } Gly, Tyr | |
| L-Ala-L-Tyr | { 113 / 116 } | N / G | } Ala, Tyr | |
| β-Ala-L-Tyr | 3 | G | β-Ala-Tyr | |
| L-Leu-L-Tyr | 107 | G | Leu, Tyr | |
| L-Glu-L-Tyr | +++ | P | Glu, Tyr | |
| L-Pro-L-Tyr | 80 | N | Pro, Tyr | (4) |
| L-Hypro-L-Tyr | 101 | N | Hypro, Tyr | (4) |
| L-Pro-L-Val | ++ | P | Pro, Val | (4) |
| L-Pro-L-Val (diketopiperazine) | | P | | |
| L-Pro-L-Leu | ++ | P | Pro, Leu | (4) |
| L-Pro-L-Leu (diketopiperazine) | | P | | |
| L-Pro-L-Arg | ++ | P | Pro, Arg | |
| Gly-L-Pro | 0 | G | Gly-Pro | (4),(5) |

2.—ACYL AMINO ACIDS

| Substrate | Extent of hydrolysis, Percent | Assay | Isolation of products | Note |
|---|---|---|---|---|
| Bz-Gly | 2 | N | | |
| Ac-Gly | 2 | N | | |
| Bz-DL-Ala | 2 | N | | |
| Ac-DL-Ala | 2 | N | | |
| ClAc-DL-Ala | 2 | N | | |
| Ac-DL-Val | | P | | |
| ClAc-DL-Val | 2 | N | | |
| Bz-L-Leu | | N | | |
| ClAc-L-Leu | 4 | N | Leu | |
| Ac-DL-Met | 2 | N | | |
| Cbz-L-Phe | 2 | N | | |
| ClAc-L-Tyr | { 3 / 9 } | N / G | } Tyr | (6) |

3.—TRIPEPTIDES AND ITS ANALOGS

| Substrate | Extent of hydrolysis, Percent | Assay | Isolation of products | Note |
|---|---|---|---|---|
| Gly-Gly-Gly | 35 | G | Gly, Gly-Gly | (7) |
| Gly-Gly-↓L-Leu | +++ | P | Gly-Gly, Leu | (7) |
| Gly-Gly-↓L-Tyr | 17 | G | Gly-Gly, Tyr, Gly-Gly-Tyr | (6) |
| DL-Ala-↓Gly-Gly | 60 | G | Ala, Gly-Gly | (7) |
| L-Leu-↓Gly-Gly | 43 | G | Leu- Gly-Gly | (8),(7) |
| L-Pro-↓Leu-Gly | 101 | G | Pro, Leu, Gly | |
| Gly-L-Pro-↓L-Leu | + | P | Gly-Pro, Leu / Gly-Pro-Leu | |
| Cbz-L-Pro-↓L-Leu | (5) | G | (Leu) | |
| Cbz-Gly-L-Hypro | (9) | G | (Hypro) | |
| Bz-Gly-↓Gly | { 8 / 7 } | G / N | } Gly | |
| Phth-Gly-↓DL-Ala | 68 | N | Ala | |
| Phth-Gly-↓DL-Val | 67 | N | Val | |
| Phth-Gly-↓DL-Leu | 64 | N | Leu | |

3.—TRIPETIDES AND ITS ANALOGS—Continued

| Substrate | Extent of hydrolysis, Percent | Assay | Isolation of products | Note |
|---|---|---|---|---|
| Phth-Gly-↓-L-Glu | 40 | N | Glu | |
| Cbz-L-Tyr-↓-Gly-NH₂ | { 27 / 3 } | G / N | } Gly-NH₂ | (8) |
| Cbz-L-Glu-↓-Gly | (17) | G | (Gly) | |
| Cbz-L-Glu-↓-L-Tyr | 21 | G | Tyr | (9) |
| Cbz-L-Glu-sbz-L-CySH | ++ | P | sbz-CySH | |
| Cbz-L-Glu(NH₂)-↓-sbz-L-CySH | ++ | P | sbz-CySH | |
| Glutathione | 0 | G | | |
| Cbz-sbz-L-CySH-↓-Ala | ++ | P | Ala | |
| Cbz-L-Ala-↓-Gly-↓-L-Leu | +++ | P | Gly, Leu | |
| Phth-Gly-↓-L-Phe | 71 | N | Phe | (6) |
| Phth-Gly-↓-DL-Phe | 97 | N | Phe | (6) |
| Phth-DL-Ala-↓-DL-Phe | 182 | N | Phe | (6) |
| Phth-DL-Phe-↓-DL-Ala | 125 | N | Ala | |
| Phth-DL-Ala-↓-DL-Val | 85 | N | Val | |

4—AMINO ACIDAMIDES

| Substrate | Extent of hydrolysis, Percent | Assay | Isolation of products | Note |
|---|---|---|---|---|
| Gly-NH₂ | 6 | C | Gly-NH₂, (Gly) | |
| L-Leu-NH₂ | { 26 / 24 } | C / G | } Leu, (Leu-NH₂) | (3) |
| DL-Norleu-NH₂ | 51 | C | Norleu, (Norleu-NH₂) | (3) |
| Bz-Arg-NH₂ | 8 | C | | (10) |
| | 8 | G | | (11) |
| Gly-↓-L-Tyr-↓-NH₂ | +++ | P | Gly, Tyr | (8) |
| L-Ala-↓-L-Tyr-↓-NH₂ | +++ | P | Ala, Tyr | (8) |
| L-Glu-↓-L-Tyr-↓-NH₂ | +++ | P | Glu-Tyr | (8) |
| L-Glutamine | 4 | G | | |
| L-Asparagine | 5 | G | | |

5.—AMINO ACID ESTERS AND ORGANIC ACID ESTERS

| Substrate | Extent of hydrolysis, Percent | Assay | Isolation of products | Note |
|---|---|---|---|---|
| Gly-OMt | 30 | G | Gly | |
| Bz-L-Arg-↓-OMt | 80 | G | | {(10) / (11)} |
| Gly-↓-L-Tyr-↓-OEt | +++ | P | | (12) |
| Ethyl acetate | 1 | F | | |
| Butyl acetate | 1 | F | | |
| Methyl butyrate | 21 | F | | |
| Ethyl butyrate | 17 | F | | |
| Ethyl valerate | 11 | F | | |

Bz: Benzoyl-; Cbz: Carbobenzoxy-; Ac: Acetyl; ClAc: Chloroacetyl-; Phth: Phthaloyl-; sbz: S-Benzyl.
Reaction—Substrate, 0.05 mM./ml.; Enzyme, 0.22 mg. PN/ml., 40° C, pH 7.0–7.2, 24 hours hydrolysis.
Assay—G: Grassmann-Heyde's alcohol titration method: N: Cocking-Yemm's ninhydrine colorimetric method; C: Conway's micro diffusion method; P: Paper chromatography; F: Matsubara's formol titration method. Hydrolysis extent for DL-compound was converted into the values for L-compound. ↓ indicates the cleavable position.

NOTE.—(1) Specific substrate for Glycylglycine dipeptidase, (2) for Glycyl-L-leucine dipeptidase, (3) for Leucine aminopeptidase, (4) for Iminodipeptidase, (5) for Prolidase, (6) for Carboxypeptidase, (7) for Aminotripeptidase, (8) for Chymotrypsin, (9) for Pepsin, (10) for Trypsin, (11) for Papain, (12) for Cathepsin C.

TABLE II
*Extent of Hydrolysis of Proteins With* Streptomyces griseus *Protease*

| Protein | —NH₂ liberated (mg. NH₂—N/100 mg. protein [1]) | | |
|---|---|---|---|
| | (A) Hydrolysis with enzyme,[2] mg. | (B) Hydrolysis with HCl,[3] mg. | Extent of hydrolysis (A/B)×100, percent |
| Ovalbumin | 7.86 | 8.94 | 87.0 |
| Casein | 6.96 | 9.30 | 74.8 |
| Wheat gluten | 6.25 | 7.84 | 80.0 |

[1] NH₂—N was determined by the use of the van Slyke's apparatus.
[2] Reaction—Enzyme, 3.5 PU/100 g. protein, pH 7.4, 40° C., 72 hours.
[3] Reaction—6 N NCl used 7 volumes, 110° C., 24 hours.

TABLE III
*Comparison of Hydrolysis Extent For Casein With Various Proteases* [1]

| Protease | Enzyme added (mg./g. casein) | —COOH liberated [2] (eq. COOH/ 100 mg. casein) | Relative ratio | Extent of hydrolysis, percent |
|---|---|---|---|---|
| St. griseus protease | 7 | 360 | 1.00 | 75 |
| Trypsin | 7 | 112 | 0.31 | 23 |
| Chymotrypsin | 7 | 76 | 0.21 | 16 |
| Pepsin (crude) | 14 | 151 | 0.42 | 31 |
| Papain (crude) | 70 | 136 | 0.38 | 28 |
| Papain | 140 | 144 | 0.40 | 30 |
| Taka-diastase | 70 | 138 | 0.38 | 28 |
| Bac. subtilis proteinase | 7 | 196 | 0.54 | 40 |

[1] Reaction—Substrate 5% casein solution, pH 7.4 (pH 2.0 for pepsin), 40° C., 72 hours.
[2] Assay—The casein-formol titration method.

TABLE IV
*Free Amino Acids Liberated From Proteins*

1.—FROM 100 G. OF CASEIN

| Amino acid | (A) Hydrolysis with enzyme,[1] grams | (B) Hydrolysis with NCl,[2] grams | Yield of amino acid (A/B)×100 |
|---|---|---|---|
| Ala [3] | 1.47 | 2.99 | 49.2 |
| Arg | 3.77 | 5.26 | 71.6 |
| Asp | 2.78 | 6.07 | 45.7 |
| CySH | 0.49 | 0.15 | |
| Glu | | 10.64 | |
| Gly | 1.10 | 1.82 | 60.5 |
| His | 2.40 | 3.03 | 79.2 |
| I leu | 3.04 | 5.27 | 57.7 |
| Leu | 5.98 | 9.79 | 61.1 |
| Lys | 5.15 | 6.99 | 73.7 |
| Met | 2.27 | 2.42 | 93.8 |
| Phe | 4.19 | 5.70 | 73.5 |
| Pro | 6.11 | 9.87 | 61.9 |
| Ser | 3.70 | 5.27 | 70.2 |
| Thr | 2.82 | 3.58 | 78.8 |
| Try | 1.00 | 0 | |
| (Try) | (1.17) | (1.40) | (83.6) |
| Tyr | 4.46 | 5.50 | 81.1 |
| (Tyr) | (4.73) | (6.20) | (76.3) |
| Val | 4.10 | 6.73 | 60.9 |

2.—FROM 100 G. OF SOY BEAN GLYCININ

| Amino acid | (A) | (B) | Yield |
|---|---|---|---|
| Ala [3] | 2.17 | 3.28 | 62.2 |
| Arg | 6.28 | 7.99 | 78.6 |
| Asp | 3.04 | 10.55 | 28.8 |
| CySH | 1.10 | 0.44 | |
| Glu | 7.82 | 11.25 | 69.5 |
| Gly | 2.37 | 3.11 | 76.2 |
| His | 1.60 | 2.05 | 78.0 |
| I leu | 3.45 | 4.19 | 82.3 |
| Leu | 5.03 | 6.55 | 76.8 |
| Lys | 3.15 | 3.91 | 80.6 |
| Met | 0.87 | 0.83 | 104.8 |
| Phe | 3.98 | 4.88 | 81.6 |
| Pro | 1.88 | 3.76 | 50.0 |
| Ser | 4.99 | 5.01 | 99.6 |
| Thr | 2.44 | 2.82 | 86.5 |
| Try | 0.80 | 0 | |
| Tyr | 3.05 | 3.00 | 101.6 |
| Val | 3.13 | 4.10 | 76.3 |

[1] Reaction—Enzyme, 3.5 PU/100 g. protein, pH 7.4, 35° C., 72 hours.
[2] Reaction—6 N HCL 40 volumes, 115° C., 24 hours.
[3] Assay—Bioassay; excepting the parenthesized amino acids which are determined by the spectrophotometric assay.

TABLE V
Comparison of Protease Productivity of Some Microorganisms Commercially Used

| Strain: | PU/ml. of culture broth |
|---|---|
| Streptomyces griseus | $7-10 \times 10^{-13}$ |
| Streptomyces aureofaciens | $0.15 \times 10^{-13}$ |
| Streptomyces venezuelae | $0.18 \times 10^{-13}$ |
| Streptomyces hachijoencis | $0.8 \times 10^{-13}$ |
| Bacillus subtilis-N | $7-10 \times 10^{-13}$ |
| Bacillus subtilis-N' | $7-10 \times 10^{-13}$ |
| Bacillus subtilis-R | $6-8 \times 10^{-13}$ |

What is claimed:

1. A protease produced in and isolated from the culture broth of *Streptomyces griseus* and possessing the following properties: molecular weight $M_{SD}=19,200-20,800$; sedimentation constant $s_{20,w}=2.8S$; diffusion constant $D_{A20,w}=13.1$ or $D_{\mu 20,w}=13.4 \times 10^{-7}$ (cm.²/sec.); elemental composition C, 52.0%; H, 6.8%; N, 14.8%; Ca, 0.8%; optimum pH for the enzyme activity 7.5–8.5; hydrolyzing activity for protein: extremely strong; said protease having both "endo-peptidase" and "exo-peptidase" enzymatic action; substrate specificity; extremely broad; first order proteolytic coefficient $C=3.34 \times 10^{-2}$ for glycyl-L-leucine, $C=0.18 \times 10^{-2}$ for carbobenzoxy-L-glutamyl-L-tyrosine; Michaelis' constant for glycyl-L-leucine $Km=1.25 \times 10^{-2}$ M; energy of activation for glycyl-L-leucine $Ea=2.7 \times 10^3$ cal./mol.

2. A method of producing the protease as claimed in claim 1 comprising separating and isolating streptomycin and said protease from the culture broth of *Streptomyces griseus* by passing the filtrate of said culture broth in series through two adsorption columns, the first of said columns containing a highly crosslinked cation exchange resin wherein streptomycin is adsorbed, and the second of said columns containing a less crosslinked exchange resin wherein protease is adsorbed, and eluting said adsorbed substances from the respective columns.

3. The method of claim 2 wherein the streptomycin is eluted by means of dilute mineral acid and the protease is eluted with a sodium salt buffer.

4. The method of claim 2 wherein the less crosslinked exchange resin is a phenol-type resin.

5. The method of claim 2, wherein the less crosslinked resin is a cation exchange resin.

6. The use of the protease defined in claim 1 to produce free amino acid comprising reacting said protease with proteinous material to cause enzymatic digestion of said material and the production of free amino acids.

7. The use of the protease defined in claim 1 to reduce excess protein comprising reacting said protease with the excess protein to cause enzymatic digestion thereof and thereby its consequent reduction.

8. The use of the protease defined in claim 1 comprising adding the protease to an alimentary product to hydrolyze protein therein and thereby improve the quality of the alimentary product.

9. A method comprising culturing *Streptomyces griseus* to form a culture broth containing streptomycin and protease and separately isolating the streptomycin and the protease, the latter having an extremely strong hydrolyzing activity for protein both "endo-peptidase" and "exo-peptidase."

References Cited in the file of this patent
UNITED STATES PATENTS

| | | |
|---|---|---|
| 1,391,219 | Takamine et al. | Sept. 20, 1921 |
| 2,528,188 | Taylor | Oct. 31, 1950 |
| 2,750,347 | Burnett | June 12, 1956 |
| 2,848,371 | Yoshida | Aug. 19, 1958 |
| 2,936,265 | Whitehill et al. | May 10, 1960 |
| 2,953,532 | Muklberg | Sept. 20, 1960 |
| 2,988,487 | Nickerson et al. | June 13, 1961 |
| 3,036,960 | Lallouette | May 29, 1962 |

OTHER REFERENCES

Waksman: The Actinomycetes, published by the Chronica Botonica Company, Waltham, Mass., 1950, pages 100–103.